United States Patent [19]

Martin et al.

[11] 4,101,114
[45] Jul. 18, 1978

[54] CABLE PULLING SYSTEM

[75] Inventors: Bernard L. Martin, San Rafael; Bruce N. Vogel, South San Francisco, both of Calif.

[73] Assignee: Carpenter Rigging and Supply Company, Inc., San Francisco, Calif.

[21] Appl. No.: 841,306

[22] Filed: Oct. 12, 1977

[51] Int. Cl.² ........................................... E21C 29/16
[52] U.S. Cl. .......................................... 254/134.3 FT
[58] Field of Search ............... 254/134.3 R, 134.3 FT; 15/104.3 SN, 104.3 G; 294/19, 82 R

[56] References Cited
U.S. PATENT DOCUMENTS

| 1,049,825 | 1/1913 | Dubruiel | 254/134.3 FT |
| 3,586,293 | 6/1971 | Betta | 254/134.3 R |
| 3,858,848 | 1/1975 | MacFetrich | 254/134.3 FT |

Primary Examiner—Robert C. Watson
Attorney, Agent, or Firm—Alvin E. Hendricson

[57] ABSTRACT

A system for drawing one or more cables, such as electrical cables or conductors through a conduit of limited diameter wherein each cable has the strands or conductors thereof wedged in a first part of a connector and a second part of such connector is removably attached thereto with a line engaging the second part of each connector and secured to a single swivel head having a draw line attached thereto.

6 Claims, 4 Drawing Figures

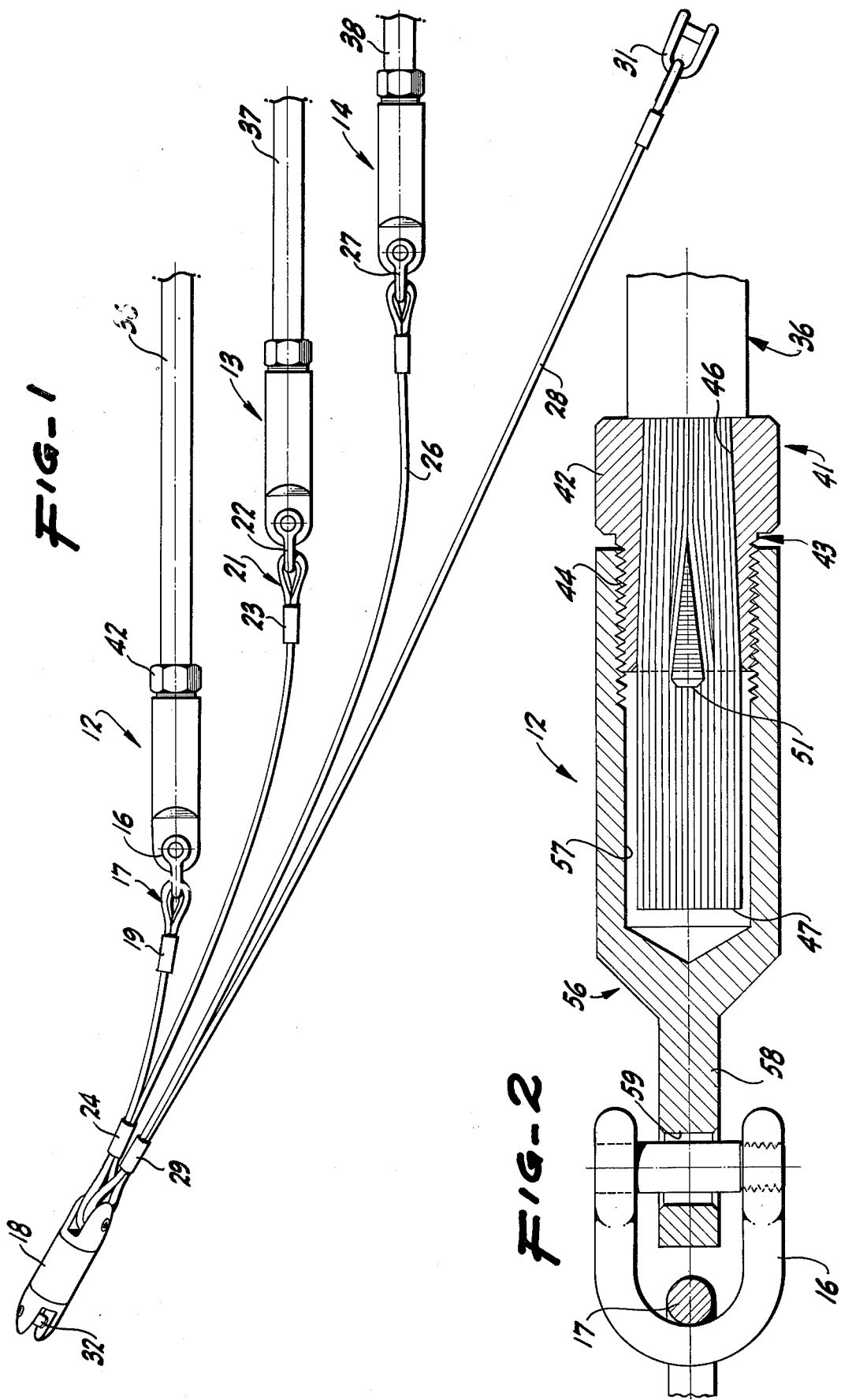

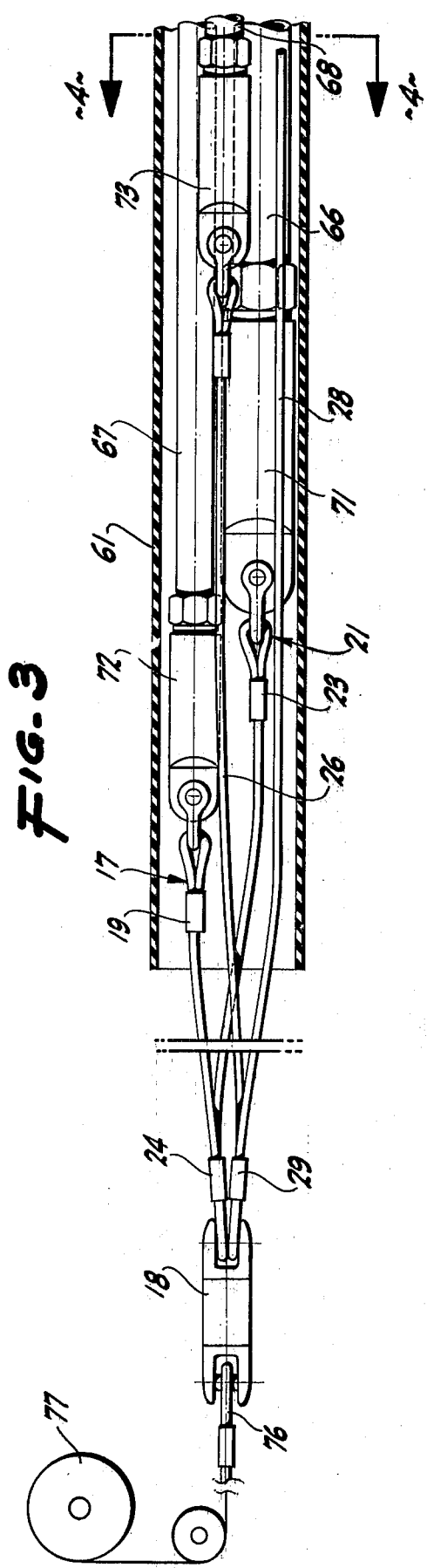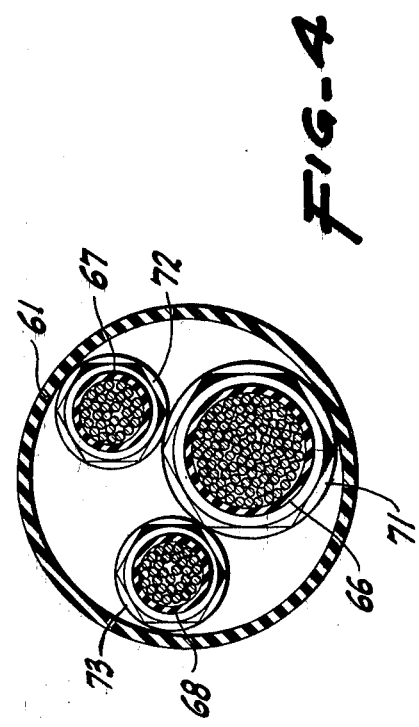

CABLE PULLING SYSTEM

BACKGROUND

The installation of underground electrical power lines in cities is normally accomplished by passing one or more multiple conductor electrical cables through an insulating conduit suitably located beneath the ground. The foregoing type of installation is commonly required by codes or the like and above ground installations are also commonly placed in an insulating conduit even though each electrical cable includes electrical insulation thereabout.

With the advent of commercially available insulating conduits for electrical cables, there arose various problems of inserting or passing electrical cables therethrough and these problems have been compounded by the necessity, or at least the desire to pass as many cables as possible through each conduit. Normally, a light line, such as a cord or the like is extended through underground conduit as the conduit is placed in position in a trench or the like. Subsequently, a heavy wire, cable, or the like, is pulled through the conduit by the cord and then the wire or cable is attached in some manner to the end of an electrical cable having many conductors for pulling the electrical cable through the conduit. While this procedure is widely employed, it has been found that problems arise in connecting the pulling wire or line to a cable end and also, it is very difficult to pull a plurality of cables through a conduit, particularly, if they substantially fill the conduit. The pulling of large power cables through a conduit is normally accomplished with a power winch, as very considerable forces are required, because of the cable weight and possible resistance, if a tight fit occurs.

Despite the longstanding problems encountered in pulling large electrical cables through conduits, this operation is still carried out in substantially the same manner as was employed decades ago. Cable hangup during pulling and breaking of the connection between cable and draw line still occur with substantial loss of time and money, particularly by electrical power distribution companies. The present invention provides a simple but effective system for pulling large cables through conduits without the problems of the prior art.

SUMMARY OF INVENTION

The present invention provides a system for engaging the ends of a plurality of electrical cables and drawing or pulling the cables through a conduit with the cable ends in offset relation to each other. The system includes a plurality of slings of different lengths mounted on a swivel connector with selected slings each connected to an eye socket adapted to be threaded onto a sleeve with a cable end fitting tightly therethrough and a tapered plug disposed among the cable conductors within the eye socket.

Cable ends are tightly gripped by the system hereof so that loss of a cable end during a pulling operation is substantially precluded. The system hereof spaces the ends of cables that are to be simultaneously pulled through a conduit and employs swivel connections so that the cables will not bind as they are pulled through a conduit.

The means employed herein for engaging cable ends are provided in a range of different sizes in order to properly engage cables of different diameters, however, it is only the sleeves of these means which must fit the cable and thus one size of eye socket is provided for some range of sleeve sizes, in order to minimize the number of parts that are required for a complete set of elements required by the system hereof to accommodate electrical cables of various sizes.

DESCRIPTION OF FIGURES

The present invention is illustrated as to a single preferred embodiment in the accompanying drawings, wherein FIG. 1 is a side or top view of a system in accordance herewith and having the slings and connectors spread apart for viewing;

FIG. 2 is a longtidunal central sectional view of a cable gripping means with a cable therein;

FIG. 3 is an illustration of a plurality of cables being simultaneously pulled through a conduit by the system hereof; and FIG. 4 is a transverse cross-sectional view of the conduit and cables of FIG. 3 taken in the plane 4—4 of FIG. 3.

DESCRIPTION OF PREFERRED EMBODIMENT

The system of the present invention is comprised of a plurality of elements which cooperate together to positively engage and grip the ends of electrical cables for pulling these cables through a conduit. The gripping means are staggered or offset longitudinally of a swivel connector so as to be disposed in spaced relation as they are drawn through a condiut. The gripping means of the present invention are connected by slings to a swivel connector which, in turn, is adapted to be connected to a draw line or cable employed to pull the electrical cables engaged by the system hereof through a conduit. Spacing of the cable ends by the system hereof provides not only for the pulling of a maximum possible amount of cables through a conduit, but also provides the capability of pulling a plurality of cables through a conduit having curves and even right angle bends without binding. A swivel connection is provided for preventing the electrical cables from twisting as a result of draw cable turning during pulling operations.

Referring now to FIG. 1, there will be seen to be illustrated a system in accordance with the present invention including three cable gripping means 12, 13 and 14. Each of these gripping means are connected in the system in the same manner and gripping means 12, for example, will be seen to be connected by a shackle 16 to a sling 17 that, in turn, is connected to one end of a swivel connector 18. The sling 17 is shown to have a loop at each end thereof with the foreward loop extending about a rear pin of the swivel connector and the rear loop extending through the shackle 16 on the gripping means 12. The sling 17 may be formed of wire cable, for example, in a conventional manner including one or more cable connectors 19. Additionally, in the embodiment of FIG. 1, there is illustrated a sling 21 having a loop end formed by a connector or sleeve 23 extending through a shackle 22 on the gripping means 13 and having a somewhat elongated portion extending forewardly into engagement with the sling 17 as by another cable connector 24. It will be seen that the sling 21 has sufficient length to dispose the gripping means 13 behind the gripping means 12 when the slings are extended. The slings 17 and 21 may be formed of a single wire cable with the ends secured by connectors 19 and 23 and the foreward loop at the swivel connector formed by the sleeve or connector 24.

The system of FIG. 1 is further shown to include a third elongated sling 26 having a loop at the forward end thereof about the rear pin of the swivel connector 18 and a loop about the rear end thereof extending through a shackle 27 on the third gripping means 14. The sling 26 has a sufficient extent between the ends of loops thereof to dispose the gripping means 14 behind the gripping means 13 when the system is extended. There is also preferably provided a further sling 28 having the foreward end secured to the sling 26 as by a cable connector 29 and having a rear loop extending through a free shackle 31 adapted for engaging with a trailing line or the like, so as to pull a further or additional line through a conduit. Here also the slings 26 and 28 may be formed of a single cable by means of sleeves or connectors and the cables of all sleeves may be coated as with nylon to minimize friction and limit wear. It is normally desired to provide an extra line or the like extending through any closed conduit carrying cable in order to provide the future capability of pulling additional cables or materials through the conduit. Such an additional line may be attached to the free shackle 31.

It is noted that the system of FIG. 1 includes a swivel connector 18 at the foreward end thereof and this connector may be quite conventional in mounting the front and rear portions thereof in swivel connection, so that either end of the connector may be rotated relative to the other end. The foreward end of the swivel connector 18 is provided with a connector pin 32 between forewardly projecting jaws so that a draw line or further cable may be attached to the swivel connector as by a shackle.

The gripping means 12, 13 and 14 of the system of FIG. 1 are adapted to engage ends of electrical cables so that the cables may be drawn through a conduit when the system hereof is drawn therethrough. In FIG. 1, the gripping means 12, 13 and 14 are shown to be attached to the ends of cables 36, 37 and 38 respectively in the manner described below.

Individual elements of the system of the present invention are relatively conventional and thus the slings, for example, may be formed of stranded wire cables in conventional manner, however, the relative lengths of these slings are to be different, as set forth above. Shackles, cable connectors, and swivel connectors are well known in the art and are, in fact, commercially available, however, the gripping means of the present invention are particularly formed in accordance with the present invention even though they do employ a conventional gripping action.

Referring now to FIG. 2 of the drawings there will be seen to be shown one of the gripping means 12 engaging a cable 36. The gripping means includes a sleeve 41 preferably provided with a hexagonal boss 42 about the lower end thereof with an upper portion 43 extending therefrom and having external threads 44 thereabout. The sleeve 41 is provided with a central tapered bore or aperture 46 therethrough. This sleeve bore 46 has a diameter at the bottom or rear end thereof which substantially matches the diameter of the cable 36 with the insulation thereof removed, as further noted below.

Electrical cable, such as the cable 36, which is adapted to be pulled through a conduit by the system of the present invention, is generally comprised as a plurality of conductors 47 having an insulating sheath thereabout. In order to insert the cable in the gripping means, the insulation is removed from the end of the cable to leave the bare conductors extending therefrom. The sleeve is then slipped over the end of the cable about the conductors 47 thereof and it will be seen that the longitudinal extent of the bare conductors is somewhat greater than the length of the sleeve bore 46, so that the conductors extend from the threaded end of the sleeve. A conical plug 51 is then inserted in the end of the cable between the conductors extending from the sleeve 41 by spreading the conductors, and the conductors are drawn back together about the plug. The conical plug 51 may have serrations thereabout in order to grip the conductors of the cable. A cylindrical eye socket 56, having a rear axial cylindrical bore 57 therein, is then placed upon the sleeve 41 by threading internal threads in the bore 57 onto the external threads 44 on the sleeve. The resultant engagement of sleeve and eye socket is illustrated in FIG. 2, and it will be seen that the conductors of the cable are somewhat spread apart by the plug 51, so that any attempt to withdraw the cable from the gripping means 12 will cause the conductors to bind in the internal tapered bore of the sleeve 41 and prevent the cable from being withdrawn.

The eye socket 56 is provided with a forewardly extending portion 58 of reduced cross-section having an aperture 59 therethrough. A shackle 16 is shown to have the pin thereof mounted through this eye socket aperture 59 with the sling 17 having a loop thereof through the shackle. The pins on all shackles herein and on the swivel connector hereof have a stress proof fit flush with the shackle or connector sides. The pins are threaded into one side of the shackle, for example, and have a hexagonal recess in the other end to accept an Allen wrench or the like for threading the pin into place, as shown in FIG. 2. This flush engagement of shackle pins minimizes protuberances which might cause additional friction or binding of the shackle when drawn through a conduit. With the gripping means illustrated in FIG. 2, it is possible to positively engage the end of an electrical cable by gripping means having a diameter only slightly greater than the cable so that the cable may be drawn or pulled longitudinally thereof without danger of any parting of the gripping means and cable end.

Operation of the present invention to draw a plurality of electrical cables through a conduit is illustrated in FIGS. 3 and 4 wherein there is shown a conduit 61 through which a plurality of three illustrated cables are being pulled by the present invention. Usually, cables of the same diameter are drawn through a conduit and merely, as an example, there are illustrated within the conduit 61, a large cable 66 and two smaller cables 67 and 68. A large sized clamping means 71, such as the clamping means described above, is shown as being engaged with the foreward end of the cable 66 and similar smaller gripping means 72 and 73 are shown to engage the ends of the smaller cables 67 and 68, respectively. As noted above, the present invention provides each gripping means with a sleeve which substantially fits the conductors of the cable with which it is adapted to be employed and thus in this illustration, there are shown gripping means of different sizes. The shackles, slings, cables and connectors of the system illustrated in FIG. 3 are numbered therein the same as in FIG. 1. It will be seen that the gripping means are offset with relationship to each other longitudinally within the conduit, so that the gripping means do not engage or contact each other. This arrangement of the present invention is quite important in minimizing friction of the connectors with the conduit through which they are to be pulled and in particular provides the present invention with the cability of pulling a plurality of cables through conduits having bends therein. In practice, cable conduits often include 90° bends and the present offset relation of cable ends and connectors provides for pulling a number of cables around such bends without binding and undue friction so as to provide a much faster and smoother pull. In some circumstances, such as shown in FIGS. 3 and 4, it might not even be possible to pull the cables shown through a straight conduit of the diameter illustrated, let alone a curved conduit if the connectors were not longitudinally offset in accordance with the present invention.

The cables that are to be drawn through the conduit are pulled through the conduit by connecting the system of the present invention to the cable ends, as described above and then connecting a draw line or draw cable 76 to the swivel connector 18 in extension through the cable. The draw line is then wound about a winch or the like 77 which is driven to reel the cable about the winch and consequently draw the system of the present invention and attached electrical cables through the conduit. Once the electrical cables have been drawn or pulled completely through the conduit, the gripping means are removed from the ends of the cables and a common manner of accomplishing this is to merely cut the cables adjacent the gripping means. The gripping means with short cable ends therein may be separated in the field with a vise, hammer and punch or may be returned to a shop or the like for disassembly and removal of the ends of conductors of the cables.

There has been described above the elements of a cable pulling system in accordance with the present invention, and the operation of attaching the system of the present invention to cable ends and the pulling of the cables with the system through a conduit. It is to be appreciated that conduits for cables, underground, for example, may have a rather considerable length so that a very substantial force may be required to pull a plurality of cables therethrough. Not only are the cables themselves quite heavy, but also the friction of these cables against the conduit walls provide a substantial resistance tending to part the connection of cable pulling means and cables. The present invention provide a positive engagement of the system hereof with cable ends whereby parting of these connections is substantially precluded. The elements of the present invention are preferably made of steel and the slings and cables or lines of the invention and employed therewith, are preferably metal stranded cables of substantial tensile strength. It is also to be noted that conventional rigging principles and precautions may be employed with the system of the present invention. Vinyl-coated cable may be employed to limit wear. All of the elements of the present invention are separable from each other as by the shackles employed inasmuch as the shackles have removable pins and thus different gripping means may be employed with different slings to make up any desired arrangement of cable pulling means in accordance with the present invention.

Although the present invention has been described with respect to a single preferred embodiment thereof, it will be apparent to those skilled in the art, that numerous modifications and variations are possible in accordance with the present invention, and consequently, it is not intended to limit the invention to the precise terms of description or details of illustration.

What is claimed is:

1. A system for pulling electrical cables through a conduit comprising
   a plurality of gripping means adapted to positively engage the ends of electrical cables in axial extension therefrom,
   a swivel connector adapted to engage a line for drawing the system through a conduit, and
   flexible connecting means having looped ends connected to said swivel means and said gripping means with lengths intermediate said looped ends being different to dispose said gripping means apart, at least the length of a gripping means.

2. The system of claim 1 further defined by said gripping means each including a threaded sleeve dimensioned to fit about the conductors of an electrical cable, a tapered plug adapted to be inserted into the ends of cable conductors extending through said sleeve and an eye socket adapted to be threaded onto said sleeve about cable conductors extended therethrough and having an opening for receiving a shackle engaging one of said flexible connecting means.

3. The system of claim 2 further defined by separate threaded sleeves having the same thread diameter to engage like eye sockets and different sized openings therethrough to engage cables of different diameters.

4. The system of claim 1 further defined by said gripping means each having a first part having a tapered bore therethrough with the small diameter therefor substantially equal to the diameter of a cable to be engaged thereby with the cable insulation removed and a second part adapted to threadably engage said first part in axial extension therefrom, and said system being adapted to simultaneously pull electrical cables of different diameter through a conduit.

5. The system of claim 1 further defined by said flexible connecting means comprising at least one cable having a loop at a first end connected to said swivel connector and second and third looped ends disposed apart longitudinally a distance at least equal to the length of a gripping means.

6. The system of claim 1 further defined by said flexible connecting means comprising
   a first sling connecting said swivel means and a first gripping means, and
   a second sling connected at a first looped end thereof to said swivel connector, and having second and third looped ends spaced apart longitudinally, at least the length of a gripping means and connected to second and third gripping means for spacing apart said gripping means longitudinally of said system.

* * * * *